Patented Oct. 14, 1924.

1,511,394

UNITED STATES PATENT OFFICE.

FREDERICK TASKER BURGESS, OF LONDON, ENGLAND, ASSIGNOR OF ONE-HALF TO BENTLEY MOTORS LIMITED, OF LONDON, ENGLAND, A BRITISH COMPANY.

COMPENSATING MECHANISM FOR VEHICLE BRAKES.

Application filed January 24, 1924. Serial No. 688,272.

*To all whom it may concern:*

Be it known that I, FREDERICK TASKER BURGESS, a subject of the King of England, residing at London, England, have invented certain new and useful Improvements in Compensating Mechanism for Vehicle Brakes, of which the following is a specification.

This invention relates to mechanism for equally distributing the pull or the like to a pair of brakes embodying any suitable known form of compensating device, such as a balancing beam, toothed gear, or pulley and cable mechanism. Usually the device employed is comparatively frictionless, with a result that, should one of the brake mechanisms be stiff, or possess a stronger "take off" spring than the other, the extra resistance causes that brake not to be applied, and a correctly distributed braking effect is thus not obtained.

It is the object of the present invention to avoid this, which is effected by frictionally clutching together the primary and secondary members of the compensating mechanism. For example, where a balancing beam compensating device is used, the lever or the equivalent carrying the centre of the beam is the primary member and is frictionally clutched to the two arms engaged by the ends of the beam which arms constitute the secondary members. Thus all three move practically solidly together until some considerable resistance is experienced by one of the arms, when the friction device slips and the effect is properly distributed. The parts then remain in the same relationship until a fresh unequal resistance is met with.

In the accompanying drawings.

Like letters indicate like parts throughout the drawings.

Figure 1:
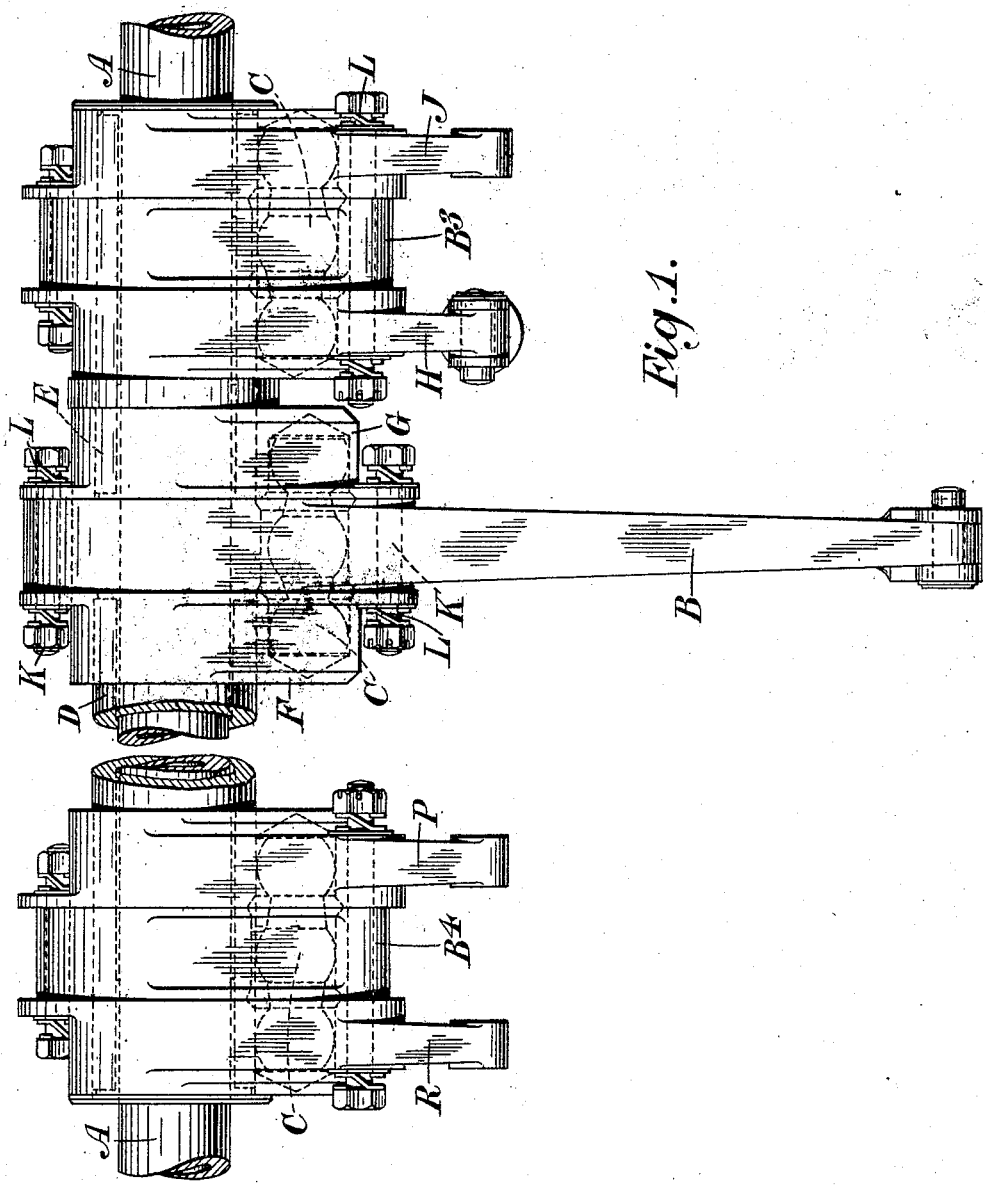
Figure 1 is a rear view of part of a cross member carrying three compensating or balance devices of a known type to which this invention has been applied.
Figure 2:
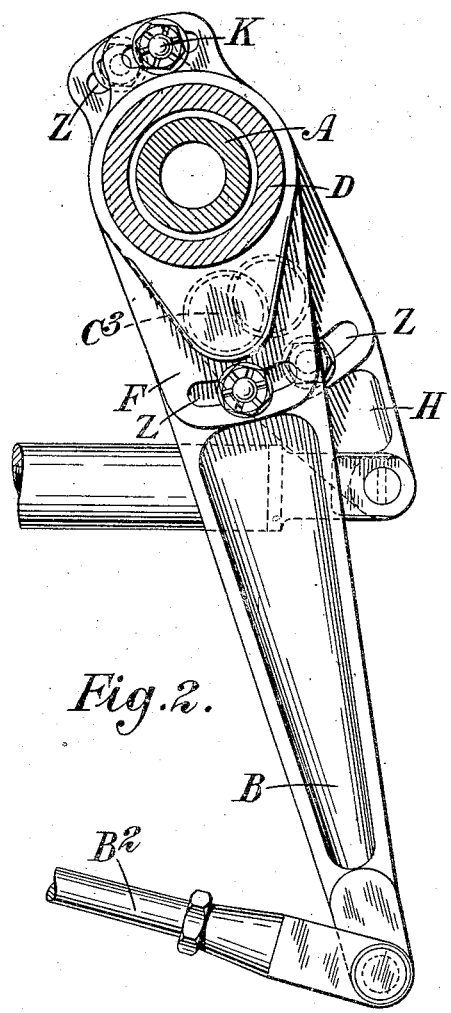
Figure 2 is an end view of the same.
Figure 3:
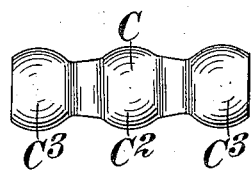
Figure 3 is a side view of the balancing beam used.

In this construction, there is mounted upon a cross shaft A a long lever B connected by the rod $B^2$ to a brake lever or pedal and constituting a primary member. In an aperture near the hub of this lever is pivoted a short transverse beam C. This has a partly-spherical surface $C^2$ where it engages the aperture, and each end $C^3$ of the transverse beam is similarly shaped. Attached to a sleeve D is a short arm F and to the sleeve E at the other side of the lever B is a short arm G. These arms form the secondary members, and each arm has an aperture or recess entered by one end $C^3$ of the balancing beam. These parts are common in compensating mechanism of the balancing beam type, and operate in the well known manner.

Generally the arm B would be connected by the rod $B^2$ to a pedal or hand lever, the arm F by a rod to one brake and the arm G to the other. However, in the actual construction shown the arm G is connected through the sleeve E with a primary member $B^3$ carrying a second compensating beam C the ends of which engage recesses in arms H and J of which that H is coupled to one rear brake and that J to the other.

The sleeve D is extended freely along the shaft A and has attached to it the primary member B of a further compensating mechanism. This contains a beam C the ends of which engage arms P and R. The arm P is connected to one front brake and the arm R to the other front brake. Thus movement of the long lever B transmits an equal torque to all four arms H, J, P, R, and an equal pull is therefore applied to the brakes of all four wheels.

Usually the arms F and G, H and J, and P and R are quite free from the central lever B, $B^3$ and $B^4$, but according to the present invention they are clutched frictionally thereto. For example, each arm F and G, H and J and P and R is adapted to engage with the side of the levers B, or $B^3$, or $B^4$, suitable surfaces being formed for this purpose, and bolts K may be passed through from side to side as shown, these bolts passing through curved slots Z in the arms F, G, H and J. These bolts are carried by the arms B and $B^3$ and carry springs L and nuts so that the arms grip the central levers with considerable force, but are free to slip in relation to the lever when necessary.

When a pull is applied to the lever B, the arms F and G move with it, and should there be rather more resistance in the operating mechanism of one brake than the other this is overcome and there is no slip between the corresponding arm and the lever.

When the considerable resistance of application of the brakes comes on, should one of the brakes come into action first, the corresponding considerable unbalanced resistance would cause the arm concerned to remain stationary, the lever and the other arm moving further until the other brake comes into action and a proper compensation is obtained as soon as the actual braking resistance is equal. Owing to the friction between the arms and the lever this relationship remains undisturbed until the resistance again becomes substantially unequal when the parts again set themselves right automatically.

Another important feature of the present invention is that the brakes release equally, whereas with some very free compensating mechanisms, if one of the take-off springs is weak, or if there is any stiffness of the mechanism, that brake will not take off properly but will drag.

What I claim as my invention and desire to secure by Letters Patent of the United States is:—

1. In brake compensating mechanism, the combination of a primary lever, a friction surface on each side thereof, a pair of secondary arms mounted concentrically with, and one arm at each side of, said lever, a balancing beam carried by said lever and having its end engaging said arms, friction surfaces on said arms and means for pressing said arms against said lever, substantially as set forth.

2. In brake compensating mechanism, the combination of a primary lever, a friction surface on each side thereof, a pair of secondary arms mounted concentrically with, and one arm at each side of, said lever, a balancing beam carried by said lever and having its end engaging said arms, friction surfaces on said arms, a bolt carried by said lever, a curved slot in each of said arms through which passes the end of said bolt, a spring device carried at the end of said bolt engaging the outer face of one arm and an abutment upon each end of said bolt, substantially as set forth.

In testimony whereof I have signed my name to this specification in the presence of two subscribing witnesses.

FREDERICK TASKER BURGESS.

Witnesses:
WILLIAM KAY FORSTER,
LEO B. MANIAN.